United States Patent [19]

Bentley et al.

[11] 4,059,557

[45] Nov. 22, 1977

[54] POLYMER DISPERSIONS

[75] Inventors: John Bentley; Morice William Thompson, both of Maidenhead, England

[73] Assignee: Imperial Chemical Industries Limited, United Kingdom

[21] Appl. No.: 678,430

[22] Filed: Apr. 19, 1976

[30] Foreign Application Priority Data

Apr. 24, 1975 United Kingdom ............... 17060/75

[51] Int. Cl.$^2$ .......................... C08K 5/01; C08K 5/05; C08K 5/07; C08K 5/09

[52] U.S. Cl. ....................... 260/31.2 N; 260/31.2 XA; 260/32.8 R; 260/32.8 N; 260/33.4 R; 260/33.6 R; 260/33.6 UA; 260/34.2; 260/75 R; 260/75 N; 260/78 R

[58] Field of Search ..................... 260/31.2 R, 32.8 R, 260/33.6 R, 33.6 UA, 34.2, 75 N, 33.4 R, 260/31.2 N, 31.2 XA, 32.8 N

[56] References Cited

U.S. PATENT DOCUMENTS

| | | | |
|---|---|---|---|
| 3,935,155 | 1/1976 | Osmond et al. | 260/34.2 |
| 3,981,839 | 9/1976 | Asher et al. | 260/33.6 R |

FOREIGN PATENT DOCUMENTS

| | | |
|---|---|---|
| 1,123,611 | 8/1968 | United Kingdom |
| 1,143,404 | 2/1969 | United Kingdom |
| 1,206,398 | 9/1970 | United Kingdom |

OTHER PUBLICATIONS

Polymer Encyclopedia, vol. 11, Interscience, N.Y. 1969, pp. 77–78.
Modern Plastics Encyclopedia 1974–1975, McGraw–Hill, N.Y., Oct. 1974, p. 54.

*Primary Examiner*—Melvyn I. Marquis
*Assistant Examiner*—H. H. Fletcher
*Attorney, Agent, or Firm*—Cushman, Darby & Cushman

[57] ABSTRACT

A process is described for the production of a stable dispersion of a copolymer, in particular of a copolyester, copolyamide or copolyesteramide, in a non-solvent organic liquid. The process involves the steps of (1) dispersing two or more comonomers, each of which is capable of undergoing homopolymerization and is solid at the copolymerization temperature, in the liquid with the aid of a defined monomer-stabilizing agent and so as to produce monomer particles no larger than 50μ, and (2) heating the dispersion so obtained so as to bring about copolymerization, in the presence of a defined polymer-stabilizing agent. The copolymers so produced are believed to be different in structure from those obtained from the same comonomers by melt or solution copolymerization.

12 Claims, No Drawings

POLYMER DISPERSIONS

This invention relates to the manufacture of polymer dispersions, more particularly to the manufacture of dispersions of copolymers by the polymerisation of two or more comonomers each of which is in a solid, stable, microdisperse form.

In our U.S. Pat. No. 3,935,155, we have described the manufacture of a stable dispersion of particles of a polymer in an inert organic liquid medium in which the polymer is insoluble, by polymerisation of one or more reactive monomers of which one monomer is solid at the temperature at which the polymerisation reaction takes place and is essentially insoluble in the liquid medium at that temperature, whilst any other participating monomer is appreciably soluble in the liquid medium at that temperature. The process comprises two steps. In the first step, the solid monomer is dispersed in the inert organic liquid in the presence of a monomer-stabilising agent so as to produce a stable dispersion of particles of the monomer having a mean diameter not greater than $50\mu$, the monomer-stabilising agent being per se soluble in the inert organic liquid and incorporating (i) a polymeric component which is solvatable by the liquid and (ii) a grouping which is capable of becoming associated with the particles of the solid monomer. In the second step, the dispersion of solid monomer, together with any other participating monomer or monomers, is heated at the polymerisation temperature, in the presence of a polymer-stabilising agent which is per se soluble in the inert organic liquid and incorporates (a) a polymeric component which is solvatable by the liquid and (b) a grouping which is capable of effecting association with the resulting polymer as the polymer is formed.

The invention so defined is thus applicable to the case of polymerisation of a single monomer which is solid at the polymerisation temperature and is insoluble in the inert organic liquid, or to the case of polymerisation of such a monomer in conjunction with one or more other monomers which are appreciably soluble in the organic liquid at the polymerisation temperature.

It has now been found that the process of U.S. Pat. No. 3,935,155 is also applicable to the copolymerisation of at least two monomers, each of which is capable of homopolymerisation, is solid at the polymerisation temperature and is essentially insoluble in the inert organic liquid at that temperature. By means of such a process there is obtained a dispersion of a copolymer.

According to the present invention there is provided a process for the production of a stable dispersion of particles of a copolymer in an inert organic liquid medium in which the copolymer is insoluble by the copolymerisation of two or more reactive comonomers each of which is capable of undergoing homopolymerisation and each of which is solid at the temperature at which the copolymerisation reaction takes place and is insoluble in the liquid medium at that temperature, the process comprising the steps of (1) dispersing the solid comonomers in an inert organic liquid in the presence of at least one monomer-stabilising agent so as to produce stably dispersed particles of the comonomers having a mean diameter not greater than $50\mu$, each monomer-stabilising agent being per se soluble in the inert organic liquid and incorporating (i) a polymeric component which is solvatable by the liquid and (ii) a grouping which is capable of becoming associated with the particles of solid comonomer and (2) heating the dispersion of solid comonomers at the copolymerisation temperature so as to bring about the copolymerisation reaction, in the presence of a copolymer-stabilising agent which is per se soluble in the inert organic liquid and incorporates (a) a polymeric component which is solvatable by the liquid and (b) a grouping which is capable of effecting association with the resulting copolymer as the copolymer is formed.

In the specification of U.S. Pat. No. 3,935,155, the insoluble solid monomer is defined as one which has at most a very small solubility in the inert organic liquid, such that it is possible to procure initially a stable dispersion in the liquid of this monomer in finely divided particulate form and to maintain that stably dispersed state throughout the subsequent polymerisation reaction. It is stated in the said specification that there may be also present a comonomer which, whilst having an appreciable solubility in the inert organic liquid, nevertheless does not have a high solubility therein, and that such a comonomer may be present in the form of a particulate dispersion in the organic liquid, though without any restriction on the size of the particles concerned.

The present invention differs from this embodiment of the prior invention in that each comonomer involved has a very small solubility in the inert organic liquid and is individually capable of being obtained as a stable dispersion in that liquid, in the sense of the definition referred to above. Moreover each comonomer participating in the copolymerisation must be present as dispersed particles having a mean diameter not greater than $50\mu$.

As stated above, the comonomers used in the process of the invention must be such as to be capable each of undergoing homopolymerisation. At the same time, they must be capable of copolymerising with one another.

By "an inert organic liquid" we mean an organic liquid which does not take part in the copolymerisation reaction and in which the comonomers are substantially insoluble; it may be either a pure liquid or a mixture. Where the copolymerisation reaction is of the condensation type in which a by-product, such as water or ethylene glycol, is eliminated, the inert organic liquid medium is preferably capable of forming an azeotrope with the by-product; where the liquid medium is a mixture, it will usually suffice if one of the constituents is so capable. Where high molecular weight copolymer products are required, it may be necessary to "force" the copolymerisation reaction by deliberately removing the by-product from the azeotrope, e.g. by drying, freezing, or chemical methods.

Inert organic liquids which may be used in the process will in general be liquids which are free from reactive groups of the type involved in the copolymerisation reaction. Thus in many cases aliphatic or aromatic hydrocarbons will be satisfactory, these being selected for maximum convenience to have boiling points at or above the copolymerisation temperature, although it is of course possible to employ liquids which boil under atmospheric pressure at temperatures below that of copolymerisation, by operating in pressure equipment.

The process of the invention may be employed for the manufacture of dispersions of any of the common groups of addition copolymers where these are derived from two or more insoluble solid monomers, for example monomers of the acrylic or vinyl type such as acrylamide and methacrylamide, monomers containing quaternary ammonium salt groups such as methacrylyl-oxyethyl trimethyl ammonium chloride and methacrylyl-oxyethyl amido ethyl imidazolidone. The process may likewise be used for manufacturing dispersions of any of the well known groups of condensation copolymers, in particular of copolyesters, copolyamides and copolyesteramides, but also of copolyurethanes, copolycarbonates, copolyimides copolyimidazoles and copolyureas, where the condensation reaction may occur either with or without the elimination of a by-product. Thus the process is of value in the manufacture of dispersions of copolyesters from two or more high-melting comonomers such as p-hydroxybenzoic acid and 1,5-hydroxy naphthoic acid, where water is eliminated as a by-product, from comonomers such as p-acetoxybenzoic acid and 1,5-acetoxy naphthoic acid, where acetic acid is eliminated, from phenyl hydroxybenzoate by elimination of phenol, or from comonomers such as bis(hydroxyethyl) terephthalate and 2,6-bis(hydroxyethyl) naphthalate, where a glycol is formed as by-product. Likewise it may be used in the production of copolyamides from two or more high-melting comonomers or intermediates, for example the adipic acid salt of hexamethylene diamine (nylon 66 salt), the azelaic acid salt of hexamethylene diamine (nylon 69 salt), 6-aminocaproic acid and 11-aminoundecanoic acid. Copolyesteramides may be made from such monomer combinations as bis(hydroxyethyl) terephthalate and nylon 66 salt.

The process of the invention is also applicable to the production of dispersions of copolymers which result from a ring-opening polymerisation reaction, for example of copolyethers derived from comonomers such as trioxan and 3:3-bis(chloromethyl) oxethane, or of copolyesters derived from lactone comonomers such as caprolactone and caprylolactone, or of copolyamides derived from lactam comonomers such as 2-azacyclononane and 2-azacyclotridecanone, or of copolypeptides derived from N-carboxyanhydride comonomers.

The copolymer-forming reactants will thus usually be monomeric compounds, but they may alternatively be very low polymers each comprising a small number of repeating units of the types occurring in the final disperse copolymer.

The basis of the process of the invention is the initial procurement of a stable dispersion of the insoluble solid monomers in finely divided, particulate form, and the maintaining of this stably dispersed state throughout the subsequent polymerisation reaction.

In the first stage of the process, the solid comonomers are dispersed in an appropriate inert organic liquid by a grinding or milling procedure, in the presence of one or more suitable stabilising agents until the mean particle size of the comonomers is not greater than $50\mu$, preferably in the range $0.1 - 10\mu$. Two alternative procedures may be followed in this stage. In the one case, the comonomers are simultaneously dispersed by grinding or milling together in the presence of the organic liquid, so producing a mixed dispersion. In the other case, each comonomer is individually and separately dispersed in an inert organic liquid and the plurality of dispersions so obtained are then thoroughly mixed together. In either of these procedures, there must be present at least one monomer-stabilising agent as previously defined, i.e. one which is capable of becoming associated with the solid comonomer particles. If desired, there may be used a different monomer-stabilising agent for each comonomer present, or there may be used a monomer-stabilising agent which is equally effective for two or more of the comonomers.

Since the solid monomers will in the majority of cases be crystalline substances, the production of the desired fine particles of monomer will usually call for actual comminution or attrition of the coarser particles in which form the monomers are commercially supplied, but in suitable cases all that may be necessary is to redisperse, by shearing action, flocculated or aggregated material which has been brought to the required primary particle size in a previous comminution step.

Where each comonomer is separately dispersed in an inert organic liquid, it is to be understood that the foregoing description includes the use of a different organic liquid for each comonomer; provided that, where two or more different liquids are employed, each of them is a non-solvent for the other comonomers and that the mixture of inert liquids resulting from the intermixing of the comonomer dispersions is a non-solvent for the copolymer subsequently formed. Usually it will be convenient to employ the same inert organic liquid for the separate dispersion of the comonomers.

As already stated, the stabilising agent, whereby each insoluble solid comonomer is dispersed in an inert organic liquid prior to the polymerisation reaction, is per se soluble in the liquid and incorporates a polymeric component which is solvatable in the liquid. Such a polymeric component will in general be of such a composition that, if it were a separate polymeric entity, it would be soluble in the liquid medium. Thus where the liquid medium is non-polar, for example an aliphatic hydrocarbon, the solvatable component will also require to be non-polar, for example a polymer chain of mainly hydrocarbon type such as a polymer of a long chain ester of acrylic or methacrylic acid, or of a vinyl ester of a long chain acid, or of a vinyl alkyl ether, or of ethylene, propylene, butadiene or isoprene, or of a hydroxyl group-containing long chain fatty acid, or of poly-t-butyl styrene terminated with amine, hydroxyl, carboxyl or unsaturated groups, or polyisobutylene, polybutadiene or polyisoprene terminated with amine, hydroxyl or carboxyl groups. Where the liquid medium consists mainly of aromatic hydrocarbon, somewhat shorter chain analogues of these polymers may be employed, such as polymers of methyl or ethoxyethyl methacrylate, ethyl acrylate, styrene or vinyl toluene. Where the liquid medium is weakly polar e.g. a higher alcohol, ketone or ester, suitable solvatable components include aliphatic polyethers, polyesters from short-chain difunctional acids and alcohols, short-chain alcohol esters of acrylic or methacrylic acids, and polymers of short-chain hydroxy-acids. If a strongly polar liquid medium is employed, such as methyl or ethyl alcohol, the solvatable components may consist of polymers of acrylic or methacrylic acids, ethylene oxide or vinyl pyrrolidone, polyvinyl alcohol or polymers of glycerol or glycol monomethacrylates.

The stabilising agent is also required to contain a grouping which is capable of becoming associated with the particles of the solid comonomer in question, in order that the solvatable polymeric components discussed in the preceding paragraph may become effectively "anchored" to, and so stabilise, the particles in the liquid medium. Such groupings will in general be polar groups which are capable of interacting with polar groupings present in the solid comonomer. For example, in the case of a comonomer which is an acid, e.g. adipic acid or terephthalic acid, acid, amine, epoxide, quaternary ammonium salt, nitrile, p-nitrobenzoate, anhydride, amide, isocyanate, methylol, alkoxymethyl or hydroxyl groups may be employed as anchoring groups. Where the solid monomer is a hydroxy compound, e.g. trimethylolethane or pentaerythritol, epoxide, anhydride, amide, isocyanate, ester, methylol, alkoxymethyl or hydroxyl groups may similarly be employed as anchoring groups.

Preferably the monomer-stabilising agent contains a plurality of anchoring groups of the type described above, these forming part of, or being attached to, a polymeric backbone to which the solvatable components are also attached as pendant groups. Such stabilisers are described in British patent specifications Nos. 1,123,611 and 1,143,404. It is further preferred that the polymeric backbone in such a structure should be flexible, rather than rigid, under the conditions of dispersing the solid comonomers in the inert organic liquid in the presence of the stabilising agent, following the principles laid down in British patent specification No. 1,206,398 in relation to the dispersion in organic liquids of pre-formed particles of polymers. As indicated in the latter specification, flexibility of the "anchor backbone" may be achieved by carrying out the step of dispersing the solid comonomers at a temperature which is above the glass transition temperature of the polymeric backbone, or by choosing the composition of the backbone so that its glass transition temperature lies below the normal ambient temperature.

The amount of the monomer-stabilising agent used (or the total amount, where more than one such agent is present) in the first stage of the process may be from 0.1% to 20% based on the total volume of the dispersed phase. For any given composition, depending on the particular monomers, stabilising agent and organic liquid present, there will be an optimum amount of stabilising agent such that the dispersion finally obtained is sufficiently fluid without its containing an excessive proportion of the free agent in solution. The optimum amount of dispersant can readily be determined in any given instance by means of simple trials. In such trials, it is not always necessary to carry out the process of the invention in full in order to assess whether or not the amount of stabilising agent is correct; the use of insufficient dispersant is revealed by a pronounced thickening of the mixture of the solid monomers and the organic liquid during the dispersion operation. If, on the other hand, the correct amount of dispersant is present, this mixture, prior to the polymerisation step, will have a viscosity not significantly higher than that of the organic liquid itself. Where thickening of the monomer dispersion is found to have occurred, it is always possible to add more stabilising agent and then continue the dispersion operation; the procedure may be repeated as often as necessary until microscopic examination of the dispersion shows that the desired particle size has been reached. It follows from the foregoing that it is preferable, when carrying out the dispersion operation on a composition for the first time, to make successive small additions of stabilising agent rather than to add a substantial amount all at once. Once the optimum amount of agent has been found, however, it is immaterial, in repeating the process on further batches of material, whether the addition of the agent is made portionwise or in a single total amount.

In the second stage of the process of the invention, the despersion in the inert organic liquid of the mixed insoluble solid comonomers, or the mixture of individual dispersions of comonomers, is heated at the copolymerisation temperature, together with any polymerisation catalyst required, in the presence of a stabilising agent which is capable of stabilising in the organic liquid the particles of the resulting copolymer as they are formed. This stabilising agent is required to comprise a polymeric component which is solvatable by the organic liquid and also a grouping which is capable of effecting association between the stabilising agent and the copolymer formed.

The solvatable polymeric group may be of a similar type, or may even be identical with, the solvatable polymeric group present in the monomer-stabilising agent or agents previously described. The grouping whereby the polymer-stabilising agent is caused to associate with the copolymer may be a polar group which is capable of interacting with a polar grouping present in the copolymer. It may, therefore, be of a similar type to the anchoring groups of the monomer-stabilising agents already referred to, whereby those agents are caused to associate with the particles of the insoluble solid comonomers, indeed, where the nature of the copolymerisation reaction is such that there is no great disparity in polarity between the insoluble solid comonomers and the copolymer formed therefrom, the same species of polar group may suffice to perform both functions. It is, however, preferred that the grouping whereby association of the polymer-stabilising agent with the copolymer is effected is a polymeric grouping of similar composition to the copolymer itself, which will in consequence be non-solvated by the organic liquid medium and will associate with the chains of the copolymer through the usual forces of inter-molecular attraction or by actual entanglement with those chains. Such a polymeric grouping may be already present in the polymer-stabilising agent as a second polymeric component thereof but differing in characteristics from the first, or solvatable, polymeric component. Alternatively, such as grouping may be produced during the course of the copolymerisation reaction by providing the polymer-stabilising agent with a reactive grouping which can participate in that reaction and so give rise to the polymer chain of similar composition to that of the main polymer, grafted on to the stabiliser molecule. The reactive grouping must be capable of reacting with a polymerisable grouping contained in at least one of the comonomers from which the copolymer is formed. Thus in the case where the final copolymer is a polyester, the reactive grouping of the stabiliser should be capable of reacting either with hydroxyl groups or with carboxylic acid groups; it may, therefore, be for example, a carboxyl, hydroxyl, epoxide or amino group. The same reactive groups are suitable where the final copolymer is a polyamide. Where the final polymer is an addition polymer, the reacting grouping of the stabiliser may be an ethylenically unsaturated grouping.

The polymer-stabilising agent may be added to the dispersion, or the mixed dispersions, in the organic liquid of the insoluble, solid comonomers after production thereof and before heating to the polymerisation temperature is commenced. Alternatively, the polymer-stabilising agent may be initially present, along with the monomer-stabilising agent, during the formation of the dispersion or dispersions of the insoluble solid comonomers. In a preferred embodiment of the invention, the monomer-stabilising function and the polymer-stabilising function are combined in one and the same substance, in which case the stabilising agent which is added in the first, dispersion stage of the process comprises (i) a solvatable polymeric component, (ii) a grouping capable of anchoring the agent to the particles of each solid comonomer, and (ii) a grouping capable of effecting association of the agent with the copolymer formed, these three components having the characteristics already described. It will be apparent from what has been stated above that the groupings (ii) and (iii) may in suitable cases be identical; thus, in the production of a dispersion of a copolyamide from amino-carboxylic acid comonomers, amino groups will serve both to anchor to the comonomer particles and to give rise to polymer chains capable of associating with the final polymer. In the latter case, it is desirable to ensure that the total proportion of such groups provided is adequate to perform both functions, but it is also necessary to avoid introducing so many groups that they can bring about an appreciable degree of crosslinking of the polymer. It is further desirable to select the anchor groups and/or the reactive groups so that they do not tend to associate too strongly with themselves, otherwise undissociatable micelles of stabiliser may be produced which will considerably reduce the stabilisation efficiency. The reactive group is preferably capable of participating in the copolymerisation reaction in its early stages, so that there is stabilisation of oligomer formed as well as of higher polymer. This applies particularly in cases where a by-product is formed in a condensation copolymerisation reaction, owing to the continuous change in polarity within the particles of reacting intermediates which occurs as the by-product diffuses out and escapes from the system. However, it is also significant in addition copolymerisations or in condensation copolymerisations when no by-product is formed, since the change in polarity within the particle in the initial stages of polymerisation may still be great enough to call for simultaneous stabilisation.

Reactive groups capable of participating in the copolymerisation reaction, if present in the stabilising agent, are preferably located in a portion of the stabiliser molecule which is remote from the solvatable component or from a grouping which is responsible for association with the particles of the insoluble solid comonomers, and it is desirable, though not essential, that the reactive groups should be attached to such a portion of the stabiliser molecule in such a way as to be sterically readily accessible. If potentially reactive groups are present in the solvatable component of the stabiliser or in proximity to an anchoring group, they should be sterically shielded or hindered.

Types of stabilising agent useful in the process of the invention include copolymers of three different types: (i) block copolymers of the AB or ABA type, where A represents the solvatable polymeric component and B represents the polymeric grouping whereby the stabiliser copolymer is associated with the particles of the final disperse copolymer; (ii) graft copolymers in which a plurality of solvatable polymeric chains are attached to a common polymeric backbone which can associate with the final disperse copolymer; and (iii) random copolymers which are as a whole soluble in the liquid medium and contain groupings which can associate with the final copolymer. In each of these cases there must be present groups which are capable of associating with the particles of insoluble solid comonomers; these may, as already indicated, be the same as the groupings which associate with the final copolymer or they may be groupings specially incorporated for the purpose.

Examples of stabilising agents according to the foregoing description which are capable of performing both monomer-stabilising and polymer-stabilising functions in the preparation of dispersions of copolyesters and copolyamides include (i) a graft copolymer of which one polymeric component is a residue derived from poly(12-hydroxystearic acid) and another polymeric component is a copolymer of ethyl acrylate with a minor proportion of a monomer providing carboxyl groups, e.g. a 95/5 ethyl acrylate/methacrylic acid copolymer; (ii) a graft copolymer of which one polymeric component is a residue of poly(tert-butyl styrene) and another polymeric component is an ethyl acrylate copolymer as described in (i).

It has been demonstrated (as described in the Examples which follow) that the products of the present process are true copolymers and not merely particulate blends of homopolymers derived from the individual monomers. The copolymers which are formed are, however, believed to be different in structure from those which are obtained (where possible) from the same comonomers by copolymerisation in the melt or in solution. In general, the latter methods of copolymerisation give rise to random copolymers in which all the polymer chains have essentially the same, statistically random, sequence of monomer units. Where such random copolymers are derived from comonomers which individually give crystalline homopolymers of relatively sharp melting point, it is found that the copolymers themselves are also relatively sharp melting, although at temperatures different from any of the homopolymer melting points. In the case of copolymers obtained according to the present invention, from comonomers which individually yield crystalline homopolymers, the melting points observed are again different from the homopolymer melting points but are quite diffuse. Their melting behaviour is furthermore different from that of a mechanical blend of the corresponding homopolymers. It is concluded (although the scope of the present invention is in no way dependent upon the correctness of this conclusion) that in these copolymers not onyl is the sequence of monomer units in each polymer chain random but, in addition, the sequence of units varies from one polymer chain to another in a random fashion.

A practical benefit which is to be derived from the present invention is as follows. When dispersions are prepared by the method of U.S. Pat. No. 3,935,155 of homopolymers which are capable of crystallisation, it is found that, under conditions which favour crystallisation of the disperse polymer, the stability of the dispersion towards flocculation may be significantly impaired. In order to prevent this happening, it is necessary to cool a freshly prepared dispersion rapidly from the polymerisation temperature to room temperature, so that the polymer has little chance of crystallising. In contrast, dispersions of copolymers made according to the present invention do not exhibit this tendency to instability, even when the corresponding homopolymers are highly crystallisable. It is, therefore, unnecessary to observe any special precautions in cooling them down from the polymerisation temperature. (It is not suggested that this property is a characteristic exclusive to dispersions of copolymers made according to this invention, but the present process is a particularly convenient way of producing copolymer dispersions).

The invention is illustrated by the following Examples, in which parts and percentages are by weight.

Examples 1, 2, 4, 6, 7 and 8 illustrate the embodiment of the invention in which the comonomers are simultaneously dispersed in the inert organic liquid and the resulting mixed dispersion is converted to copolymer. Example 3 shows the other embodiment in which the comonomers are dispersed separately and then combined for conversion to polymer. Example 5 is a comparative example according to U.S. Pat. No. 3,935,155 showing the loss of stability on slow cooling of a dispersion of a crystallisable homopolymer.

Example 1

| | |
|---|---|
| 11 - Aminoundecanoic acid | 466 g |
| 6 - Aminocaproic acid | 466 g |
| Aliphatic hydrocarbon (boiling range 170 – 210° C) | 933 g |
| Graft copolymer stabilising agent solution (see below) | 171 g |

The above ingredients were charged to a ball mill and ground for a total of 139 hours, three further additions of graft copolymer solution (41 g) being made during the grinding. The product was a fluid, non-flocculated dispersion of the mixed comonomers, having a particle size of about 2μ.

This dispersion was transferred to a reactor fitted with a stirrer and a Dean and Stark separator, along with a further quantity (620 g) of the above aliphatic hydrocarbon. The mixture was heated at reflux for 2¼ hours, initial recycling commencing at 166° C; during this time water of reaction (106 g) was removed azeotropically. The final reflux temperature was 192° C. The product was allowed to cool and there was obtained a stable, fluid dispersion of nylon 6/11 copolymer, 50/50 w/w, having a particle size of 1 – 2μ and a solids content of 35. A sample of the polymer was obtained by filtration and drying and its melting point was determined by means of a Perkin - Elmer Differential Scanning Calorimeter Model 1B. A melting range of 100° – 140° was observed. The melting points recorded in the literature for nylon 6 and nylon 11 are 215° and 185° C respectively. A 50/50 blend of powders of the two homopolymers, tested on the same Differential Scanning Calorimeter, showed two distinct melting point peaks at 218° and 182° C; the same result was reproduced on cooling the sample and re-melting. A normal random copolymer of nylon 6/nylon, 11, 50/50 w/w, prepared by the method described below, was found to have a melting point of 127° C.

The graft copolymer stabilising agent used in the above procedure was obtained by reacting poly(12-hydroxystearic acid) with glycidyl methacrylate and copolymerising the product at a ratio of 1:1 by weight with ethyl acrylate and methylacrylic acid in the proportions 95:5. It was used as a 45% solution in the above aliphatic hydrocarbon.

The normal random nylon 6/nylon 11 copolymer referred to above was made by the following procedure, according to U.S. Pat. No. 3,981,839:

| | |
|---|---|
| 6 - Aminocaproic acid | 308 g |
| 11 - Aminoundecanoic acid | 308 g |
| Ethylene glycol | 600 g |
| Aliphatic hydrocarbon (boiling range 190 – 210° C) | 1666 g |
| Graft Copolymer stabilising agent solution (see below) | 84 g |

The above ingredients were charged to a reactor fitted with a turbine stirrer and a Dean and Stark separator. The mixture was heated to reflux temperature, keeping the stirrer at the maximum possible rate. The solid reactants became dissolved in the ethylene glycol, this solution forming a separate emulsified phase stabilised by the graft copolymer stabilising agent. The mixture was heated at reflux temperature for 1½ hours, during which time 667 g of distillate (comprising 67 g of water and 600 g ethylene glycol) was removed azeotropically. Following this, part of the hydrocarbon diluent (250 g) was removed by distillation. The product was allowed to cool and there was obtained a dispersion of nylon 6/11 copolymer, 50/50 w/w, having a particle size of 5 – 20μ and a solids content of 25%. A sample of the polymer was obtained by filtration and drying, and it was found to have a melting point of 127° C.

The graft copolymer stabilising agent used in the above procedure was obtained by reacting poly(12-hydroxystearic acid) with glycidyl methacrylate and copolymerising the product at a ratio of 1:1 by weight with methyl methacrylate and the methacrylate ester of polyethylene glycol, molecular weight 750, in the proportions 50/50. It was used as a 43% solution in the above aliphatic hydrocarbon.

Example 2

| | |
|---|---|
| 6 - Aminocaproic acid | 466 g |
| Nylon 6:6 salt | 466 g |
| Aliphatic hydrocarbon (boiling range 190 – 210° C) | 933 g |
| Graft copolymer stabilising agent solution as in Example 1 | 167 g |

The general procedure of Example 1 was followed, using the above ingredients. The charge was ball milled for 208 hours, three further additions of stabilising agent solution (41 g) being made during this time. The product was a fluid, nonflocculated mixed dispersion of the comonomers, having a particle size of about 1μ.

In the reaction stage, the mixture was heated, together with a further quantity (1000 g) of the above aliphatic hydrocarbon, at reflux temperature for 2 hours, with the azeotripic removal of water (147 g). During this stage, recycling and the collection of initial distillate commenced at 165° C; the temperature rose as reaction continued and the final reflux temperature was 914° C. After the removal of hydrocarbon (500 g) by distillation, and cooling, there was obtained a stable, fluid dispersion of nylon 6/6:6 copolymer, 50/50 w/w, having a particle size of about 1μ and a solids content of 33%.

A sample of dried polymer power was found by the procedure described in Example 1 to have melting range of 150° – 180° C. Published data (Encyclopaedia of Polymer Science and Technology, Interscience, 1967, Volume 10, page 531) indicates a melting point of 160° C for a normal random nylon 6/6:6 (50/50) copolymer. The melting points recorded in the above reference for nylon 6 and nylon 6:6 215° and 250° C respectively.

Example 3

| | | |
|---|---|---|
| Charge 1 | 6 - Aminocaproic acid | 1100 g |
| | Aliphatic hydrocarbon, (boiling range 190 – 210° C) | 1100 g |
| | Graft copolymer dispersant solution as in Example 1 | 359 g |
| Charge 2 | 11 - Aminoundecanoic acid | 1100 g |
| | Aliphatic hydrocarbon (boiling range 190 – 210° C) | 1100 g |
| | Graft copolymer stabilising agent | |

Example 3-continued

| | solution as in Example 1 | 359 g |
|---|---|---|

The two charges were ball milled separately, each for 135 hours. In each case, one further addition of graft copolymer stabilising agent solution (119 g) was made during grinding. Fluid, non-flocculated dispersions of the two monomers were obtained, each of particle size about 2µ.

| Charge 3 | Product of milling charge 1 | 1092 g |
|---|---|---|
| | Product of milling charge 2 | 1092 g |
| | Aliphatic hydrocarbon as above | 814 g |
| | Graft copolymer dispersant solution as above | 50 g |

The mixed charge was heated in a reactor as described in Example 1 for 1½ hours at reflux temperature, during which time water (112 g) was removed azeotropically. Recycling commenced at 171° C when the first distillate was collected; the final reflux temperature was 198° C. Following this, hydrocarbon diluent (200 g) was removed by distillation and the product allowed to cool. There was obtained a stable, fluid dispersion of nylon 6/11 copolymer, 50/50 w/w, having a particle size of 1 - 2µ and a solids content of 38%.

A sample of dried polymer powder was found by the procedure described in Example 1 to have a melting range of 100° - 135° C.

Example 4

| 11 - Aminoundecanoic acid | 192 g |
|---|---|
| Nylon 6:6 salt | 811 g |
| Aliphatic hydrocarbon (Boiling range 190 - 210° C) | 1000 g |
| Graft copolymer stabilising agent solution (see below) | 217 g |

The general procedure of Example 1 was followed. The charge was ball milled for 139 hours with three further additions of stabilising agent solution (54 g). A fluid, non-flocculated dispersion of the mixed monomers, of particle size about 2µ, was obtained.

In the reaction stage, further aliphatic hydrocarbon (1100 g) was added and the mixture heated under reflux for 1½ hours, with the azeotropic removal of water (135 g). Recycling commenced at 176° C; the final reflux temperature was 192° C. Hydrocarbon diluent (1200 g) was then removed by distillation. On cooling, there was obtained a stable, fluid dispersion of nylon 6:6/11 copolymer, 80/20 w/w, having a particle size of 1 - 2µ and a solids content of 42%.

A sample of the dried polymer powder was found by the procedure of Example 1 to have a melting range of 210° - 235° C. The melting points recorded in the literature for nylon 6:6 and nylon 11 are 250° and 185° C respectively.

The graft copolymer stabilising agent used above was the same as that used in Example 1 but was employed as a 37% solution in the aliphatic hydrocarbon.

Comparative Example 5

| 11 - Aminoundecanoic acid | 933 g |
|---|---|
| Aliphatic hydrocarbon (boiling range 170 - 210° C) | 933 g |
| Graft copolymer stabilising agent solution (see below) | 171 g |

The general procedure of Example 1 was followed.

The charge was ball milled for 237 hours, with four further additions of stabilising agent solution (43 g). A fluid, non-flocculated dispersion of the monomer, of particle size 0.5 - 1µ, was obtained.

In the reaction stage, further aliphatic hydrocarbon (1244 g) was added. The mixture was heated at reflux temperature for 1½ hours, with the removal of water (54g). Recycling commenced at 156° C; the final reflux temperature was 180° C. The bulk of the contents of the reactor was then passed through a cooler consisting of 2 meters of copper tubing immersed in a stream of cold water, giving a rapid reduction in the temperature of the dispersion obtained from 180° to 30 ° C. This product was a fluid dispersion of nylon 11 homopolymer having a particle size of 0.5 - 1µ.

A residual quantity of the contents of the reactor was allowed to cool slowly; this was seen to solidify, becoming transformed from a fluid dispersion to a wet, crumbly solid at about 120° C. Examination of the dried polymer powder by infra-red spectroscopy, X-ray scattering and calorimetry methods indicated that the rapidly cooled material was substantially amorphous, while the slowly cooled material was crystalline. The loss of stability of the slowly cooled dispersion may be attributable to rejection of the graft copolymer stabilising agent from at least certain parts of the surface of the particle of polymer on crystallisation.

The graft copolymer stabilising agent used above was the same as that used in Example 1 but was employed as 44% solution in the aliphatic hydrocarbon.

Example 6

| 11 - Aminoundecanoic acid | 292 g |
|---|---|
| 6 - Aminocaproic acid | 308 g |
| Aliphatic hydrocarbon (boiling range 170 - 210° C) | 600 g |
| Graft copolymer stabilising agent solution (see below) | 112 g |

The above ingredients were charged to a ball mill and ground for a total of 118 hours, an extra 64 g of stabilising agent solution having been added during the grinding to overcome thickening of the mill contents. At the end of this period a further 64 g of stabilising agent solution and 600 g of aliphatic hydrocarbon were added. The product was a fluid, non-floculated dispersion of the mixed comonomers, having a particle size of around 2 - 6µ.

1930 g of this dispersion were transferred to a reactor fitted with a stirrer and a Dean and Stark separator and the mixture heated at reflux temperature for 1¼ hours. Reflux commenced at 160° C with the removal of the first water of reaction; during the period of reflux a total of 67 g of water was removed, the final reflux temperature being 177° C. The product was allowed to cool and there was obtained a stable, fluid dispersion of nylon 6/11 copolymer, 50/50 w/w, having a particle size of 1–12µ and a solids content of 29.5%. A sample of the polymer isolated and examined as described in Example 1 was found to have a melting range of 105°–140° C.

The graft copolymer stabilising agent used was poly(t-butyl styrene - g - poly(ethyl acrylate-co-methacrylic acid)), dissolved at 46% solids in the same aliphatic hydrocarbon as that used in the preparation. The graft copolymer was made by the following procedure. Poly(t-butyl styrene) having a single terminal carboxyl group on each polymer chain was made by the method described in British Pat. No. 1096912 U.S. Pat. No. 3,390,206), according to which the monomer is polymerised in the presence of an initiator and of a mercapto chain transfer agent each of which contains a carboxyl group in the molecule. The resulting polymer was then reacted with glycidyl methacrylate, and the unsaturated adduct so formed finally copolymerised with ethyl acrylate and methacrylic acid in the weight proportions 50/45/5 respectively.

Example 7

| | |
|---|---|
| 11-Aminoundecanoic acid | 102 g |
| p-Acetoxybenzoic acid | 128 g |
| Aliphatic hydrocarbon (boiling range 170 – 210° C) | 240 g |
| Graft copolymer stabilising agent solution (as in Example 1) | 30.8 g |

The above ingredients were charged to a ball mill and ground for a total of 45 hours. At the end of this period a further 240 g of aliphatic hydrocarbon was added to the mill along with 8 g of graft copolymer stabilising agent solution. The product was a fluid, non-flocculated dispersion of the mixed comonomers, having a particle size below 5µ.

650 g of this dispersion was transferred to a reactor fitted with a stirrer and Dean and Stark separator, and the mixture heated to reflux temperture. Distillate was first removed at about 155° C, the reflux temperature then rising over a few hours to 180°–182° C. The batch was held at reflux for a total of 8 hours, when 52 g of mixed water/acetic acid had been removed as distillate. The final product was a fluid dispersion of polyester/amide of particle size 1 – 4µ, which remained stable on slow cooling.

Example 8

| | |
|---|---|
| p-Xylene-α,α'-diol/terephthalate intermediate | 120 g |
| p-Xylene-α,α'-diol/isophthalate intermediate | 120 g |
| Aliphatic hydrocarbon (boiling range 170 – 210° C) | 240 g |
| Graft copolymer stabilising agent solution (as in Example 1) | 48 g |

The intermediates named above were made by reacting in a heated reactor equimolar amounts of p-xylene-α,α'-diol and dimethyl terephthalate or isophthalic acid respectively in the presence of 0.05% by weight of manganous acetate, removing 1.25 times the amount of methanol or water respectively that corresponded to production of the mono (or half) ester.

The above-listed ingredients were charged to a ball mill and ground for a total of 62 hours. A further addition of 24 g of graft copolymer stabilising agent solution was made after 48 hours grinding, because thickening of the mill contents had occured. At the end of the grinding period, another 24 g of the stabilising agent solution, together with 100 g of aliphatic hydrocarbon, were added. The product was a fluid dispersion of the ester intermediates, of particle size below 5µ.

430 g of this dispersion were transferred to a reactor fitted with a stirrer and Dean and Stark Separator. The mixture was heated to reflux temperature, and first distillate was removed at a temperature of 165° C. The batch was held under reflux for a total of 4½ hours, during which time a total of 9 g of distillate (methanol and water) was removed, the final reflux temperature being 185° C. The product was a fluid copolyester dispersion of particle size 1 – 5µ, which remained stable on slow cooling.

We claim:

1. A process for the production of a stable dispersion of particles of a copolymer selected from the group consisting of copolyester, copolyamide and copolyesteramide in an inert organic liquid medium in which the copolymer is insoluble by the copolymerization of two or more reactive comonomers each of which is capable of undergoing homopolymerization and each of which is solid at the temperature at which the copolymerization reaction takes place and is insoluble in the liquid medium at that temperature, the process comprising the steps of (1) dispersing the solid comonomers in an inert organic liquid in the presence of at least one monomer-stabilizing agent so as to produce stably dispersed particles of the comonomers having a mean diameter not greater than 50µ, each monomer-stabilizing agent being per se soluble in the inert organic liquid and incorporating (i) a polymeric component which is solvatable by the liquid and (ii) a grouping which is capable of becoming associated with the particles of solid comonomer and (2) heating the dispersion of solid comonomers at the copolymerization temperature so as to bring about the copolymerization reaction, in the presence of a copolymerstabilizing agent which is per se soluble in the inert organic liquid and incorporated (a) a polymeric component which is solvatable by the liquid and (b) a grouping which is capable of effecting association with the resulting copolymer as the copolymer is formed.

2. A process as claimed in claim 1, wherein any by-product of the copolymerisation reaction is capable of forming an azeotrope with the inert organic liquid medium or with a constituent thereof.

3. A process as claimed in claim 1, wherein the particle size of the comonomers in dispersion is in the range 0.1 – 10µ.

4. A process as claimed in claim 1, wherein the monomer-stabilising agent contains a plurality of groups capable of becoming associated with the particles of solid monomer, the said groups forming part of, or being attached to, a polymeric backbone to which the solvatable components are also attached as pendant groups.

5. A process as claimed in claim 4, wherein the polymeric backbone of the monomer-stabilising agent is flexible under the conditions of dispersing the solid monomers in the inert organic liquid.

6. A process as claimed in claim 1, wherein the total amount of monomer-stabilising agent used is from 0.1% to 20% by volume of the dispersed monomer phase.

7. A process as claimed in claim 1, wherein the solvatable polymeric group of the polymerstabilising agent is of a similar type to the solvatable polymeric group of the monomer-stabilising agent.

8. A process as claimed in claim 1, wherein the grouping of the polymer-stabilising agent which effects association with the polymer is a polymeric grouping of similar composition to the polymer itself.

9. A process as claimed in claim 8, wherein the polymerassociating grouping of the polymer-stabilising agent is produced during the course of the polymerisation reaction by participation in that reaction of a reactive grouping present in the polymer-stabilising agent.

10. A process as claimed in claim 1, wherein there is used a single stabilising agent capable of acting as both monomer-stabilising agent and polymer-stabilising agent, the agent comprising (i) a solvatable polymeric component, (ii) a grouping capable of anchoring the agent to the particles of solid monomer and (iii) a grouping capable of effecting association of the agent with the polymer formed.

11. A process as claimed in claim 10, wherein reactive groups present in the single stabilising agent which are capable of participating in the polymerisation reaction are located in a portion of the molecule of the stabilising agent remote from the solvatable component thereof or from the grouping capable of anchoring the agent to the monomer particles.

12. A process as claimed in claim 10, wherein the single stabilising agent is a graft copolymer of which one polymeric component is a residue of poly(12-hydroxystearic acid) or of poly(tertbutylstyrene) and another polymeric component is an ethyl acrylate copolymer containing a minor proportion of pendant carboxyl groups.

* * * * *